United States Patent
Wang et al.

(10) Patent No.: US 9,612,738 B2
(45) Date of Patent: Apr. 4, 2017

(54) VISUAL FEEDBACK METHOD AND APPARATUS FOR TOUCH SELECTION

(71) Applicant: Huawei Device Co., Ltd., Shenzhen (CN)

(72) Inventors: Shuoxing Wang, Shanghai (CN); Zhang Gao, Shanghai (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 50 days.

(21) Appl. No.: 14/581,769

(22) Filed: Dec. 23, 2014

(65) Prior Publication Data

US 2015/0138124 A1 May 21, 2015

Related U.S. Application Data (63) Continuation of application No. PCT/CN2014/083471, filed on Jul. 31, 2014.

(30) Foreign Application Priority Data

Nov. 21, 2013 (CN) .......................... 2013 1 0594564

(51) Int. Cl.
 *G06F 3/0488* (2013.01)
(52) U.S. Cl.
 CPC ................................ *G06F 3/0488* (2013.01)
(58) Field of Classification Search
 None
 See application file for complete search history.

(56) References Cited

U.S. PATENT DOCUMENTS

| | | | |
|---|---|---|---|
| 2008/0204427 A1* | 8/2008 | Heesemans | G06F 3/0414 345/174 |
| 2009/0102804 A1 | 4/2009 | Wong et al. | |
| 2010/0220066 A1* | 9/2010 | Murphy | G06F 1/1626 345/173 |
| 2011/0057886 A1 | 3/2011 | Ng et al. | |
| 2012/0254747 A1* | 10/2012 | Bocirnea | G06F 3/04845 715/702 |
| 2013/0172052 A1* | 7/2013 | Bengtsson | G06F 3/041 455/566 |

FOREIGN PATENT DOCUMENTS

| | | |
|---|---|---|
| CN | 101213508 A | 7/2008 |
| CN | 101414231 A | 4/2009 |

(Continued)

*Primary Examiner* — Viet Pham
*Assistant Examiner* — Christopher Kohlman
(74) *Attorney, Agent, or Firm* — Slater Matsil, LLP (57) ABSTRACT

According to a visual feedback method and apparatus for touch selection that are provided by embodiments of the present invention, touch information and a center point of touch are acquired, where the foregoing touch information is a touch area and/or touch pressure; an area size of a feedback graph is determined according to the foregoing touch information; and, by using the foregoing center point of touch as a center, the foregoing feedback graph is displayed according to the area size of the feedback graph, for a user to determine a touch position. Because the size of a feedback graph is determined according to the touch information (a touch area and/or touch pressure), precision of visual feedback for touch selection can be improved.

2 Claims, 2 Drawing Sheets

(56) References Cited

FOREIGN PATENT DOCUMENTS

| | | | |
|---|---|---|---|
| CN | 101498974 | A | 8/2009 |
| CN | 101630223 | A | 1/2010 |
| CN | 103294183 | A | 9/2013 |
| CN | 103631379 | A | 3/2014 |
| EP | 0595746 | A1 | 5/1994 |
| EP | 2302496 | A1 | 3/2011 |
| WO | 2006013518 | A2 | 2/2006 |

* cited by examiner

VISUAL FEEDBACK METHOD AND APPARATUS FOR TOUCH SELECTION

CROSS-REFERENCE TO RELATED APPLICATIONS

This application claims the benefit of International Application No. PCT/CN2014/083471, filed on Jul. 31, 2014, which claims priority to Chinese Patent Application No. 201310594564.8, filed on Nov. 21, 2013, whose applications are hereby incorporated by reference.

TECHNICAL FIELD

Embodiments of the present invention relate to communications technologies, and in particular, to a visual feedback method and apparatus for touch selection.

BACKGROUND

A touchscreen is widely applied due to an advantage of simple, convenient, and natural touch operations and good human-machine interaction experience provided by the touchscreen.

When a touch operation is performed on a touchscreen, people usually need to use feedback information on a display screen to intuitively see a touch position sensed by the touchscreen. For example, when a point on the touchscreen is touched, a feedback graph (for example, a highlighted circle) is shown on the touchscreen at the touch point, so as to feed back a touch position sensed by the touchscreen to the people. In the prior art, a size of a feedback graph is fixed. However, if a feedback graph is too large or too small, the feedback graph cannot precisely reflect a touch position, and precision of visual feedback is not high.

SUMMARY

Embodiments of the present invention provide a visual feedback method and apparatus for touch selection, so as to improve precision of visual feedback for touch selection.

A first aspect of an embodiment of the present invention provides a visual feedback method for touch selection, including:

acquiring touch information and a center point of touch, where the touch information is a touch area and/or touch pressure;

determining an area size of a feedback graph according to the touch information; and displaying, by using the center point of touch as a center, the feedback graph according to the area size of the feedback graph, for a user to determine a touch position.

With reference to the first aspect, in a first possible implementation manner, when the touch information is a touch area, the determining an area size of a feedback graph according to the touch information includes:

determining the area size of the feedback graph according to $$S = S_0 + (S_1 - S_0) \times T(s), \text{ where}$$

S is the determined area size of the feedback graph; $S_0$ is a preset minimum area of the feedback graph; $S_1$ is a preset maximum area of the feedback graph; $T(s)$ is an interpolator function; and s is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area.

With reference to the first aspect, in a second possible implementation manner, when the touch information is touch pressure, the determining an area size of a feedback graph according to the touch information includes:

determining the area size of the feedback graph according to $$S = S_0 + (S_1 - S_0) \times T(p), \text{ where:}$$

S is the determined area size of the feedback graph; $S_0$ is a preset minimum area of the feedback graph; $S_1$ is a preset maximum area of the feedback graph; $T(p)$ is an interpolator function; and p is a normalized value of acquired touch pressure, and $$p = \frac{P_{in} - P_{min}}{P_{max} - P_{min}},$$

where $P_{in}$ is the acquired touch pressure, $P_{min}$ is preset minimum touch pressure, and $P_{max}$ is preset maximum touch pressure.

With reference to the first aspect, in a third possible implementation manner, when the touch information is a touch area and touch pressure, the determining an area size of a feedback graph according to the touch information includes:

determining the area size of the feedback graph according to $S = f(s) \ast g(p)/g(p_s)$,
where:
$f(s) = S_0 + (S_1 - S_0) \ast T(s)$
$g(p) = P_0 + (P_1 - P_0) \ast p$
$g(p_s) = P_0 + (P_1 - P_0) \ast p_s$ S is the determined area size of the feedback graph; $S_0$ is a preset minimum area of the feedback graph in a case of a pressure value $p_s$; $S_1$ is a preset maximum area of the feedback graph in a case of the pressure value $p_s$; $f(s)$ is a determined area size of the feedback graph in a case of the pressure value $p_s$; s is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area;

$T(s)$ is an interpolator function; $P_0$ is a preset minimum value of a pressure variation amplitude; $P_1$ is a preset maximum value of the pressure variation amplitude; $g(p)$ is a function of the pressure variation amplitude; and p is a normalized value of acquired touch pressure, and $$p = \frac{P_{in} - P_{min}}{P_{max} - P_{min}},$$

where $P_{in}$ is the acquired touch pressure, min is preset minimum touch pressure, and $P_{max}$ is preset maximum touch pressure.

With reference to the first aspect, in a fourth possible implementation manner, when the touch information is a touch area and touch pressure, the determining an area size of a feedback graph according to the touch information includes:

determining the area size of the feedback graph according to $S=g(p)*g(s)/g(s_p)$, where:
$g(p)=S_0+(S_1-S_0)*T(p)$
$f(s)=F_0+(F_1-F_0)*s$
$f(s_p)=F_0+(F_1-F_0)*s_p$ S is the determined area size of the feedback graph; $S_0$ is a preset minimum area of the feedback graph in a case of an area parameter $s_p$; $S_1$ is a preset maximum area of the feedback graph in a case of the area parameter $s_p$;

p is a normalized value of acquired touch pressure, and $$p = \frac{P_{in} - P_{min}}{P_{max} - P_{min}},$$

where $P_{in}$ is the acquired touch pressure, $P_{min}$ is preset minimum touch pressure, and $P_{max}$ is preset maximum touch pressure; $T(p)$ is an interpolator function; $F_0$ is a preset minimum value of an area variation amplitude; $F_1$ is a preset maximum value of the area variation amplitude; f(s) is a function of the area variation amplitude; s is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area.

A second aspect of an embodiment of the present invention provides a visual feedback apparatus for touch selection, including:

an acquiring module, configured to acquire touch information and a center point of touch, where the touch information is a touch area and/or touch pressure;

a processing module, configured to determine an area size of a feedback graph according to the touch information; and a displaying module, configured to display, by using the center point of touch as a center, the feedback graph according to the area size of the feedback graph, for a user to determine a touch position.

With reference to the second aspect, in a first possible implementation manner, when the touch information is a touch area, the processing module is specifically configured to determine the area size of the feedback graph according to $S=S_0+(S_1-S_0)\times T(s)$, where:

S is the determined area size of the feedback graph; $S_0$ is a preset minimum area of the feedback graph; $S_1$ is a preset maximum area of the feedback graph; $T(s)$ is an interpolator function; and s is a normalized value of an acquired touch area, and $$s = \frac{S_{in} - S_{min}}{S_{max} - S_{min}},$$

where in $S_{in}$ s the acquired touch area, $S_{min}$ is a preset minimum touch area, and $S_{max}$ is a preset maximum touch area.

With reference to the second aspect, in a second possible implementation manner, when the touch information is touch pressure, the processing module is specifically configured to determine the area size of the feedback graph according to $S=S_0+(S_1-S_0)\times T(p)$, where:

S is the determined area size of the feedback graph; $S_0$ is a preset minimum area of the feedback graph; $S_1$ is a preset maximum area of the feedback graph; $T(p)$ is an interpolator function; and p is a normalized value of acquired touch pressure, and $$p = \frac{P_{in} - P_{min}}{P_{max} - P_{min}},$$

where $P_{in}$ is the acquired touch pressure, $P_{min}$ is preset minimum touch pressure, and $P_{max}$ is preset maximum touch pressure.

With reference to the second aspect, in a third possible implementation manner, when the touch information is a touch area and touch pressure, the processing module is specifically configured to determine the area size of the feedback graph according to $S=f(s)*g(p)/g(p_s)$, where:
$f(s)=S_0+(S_1-S_0)*T(s)$
$g(p)=P_0+(P_1-P_0)*p$
$g(p_s)=P_0+(P_1-P_0)*p_s$ S is the determined area size of the feedback graph; $S_0$ is a preset minimum area of the feedback graph in a case of a pressure value $p_s$; $S_1$ is a preset maximum area of the feedback graph in a case of the pressure value $p_s$; f(s) is a determined area size of the feedback graph in a case of the pressure value $p_s$; s is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area;

$T(s)$ is an interpolator function; $P_0$ is a preset minimum value of a pressure variation amplitude; $P_1$ is a preset maximum value of the pressure variation amplitude; g(p) is a function of the pressure variation amplitude; and p is a normalized value of acquired touch pressure, and $$p = \frac{P_{in} - P_{min}}{P_{max} - P_{min}},$$

where $P_{in}$ the acquired touch pressure, $P_{min}$ is preset minimum touch pressure, and $P_{max}$ is preset maximum touch pressure.

With reference to the second aspect, in a fourth possible implementation manner, when the touch information is a touch area and touch pressure, the processing module is specifically configured to determine the area size of the feedback graph according to $S=g(p)*f(s)/g(s_p)$, where:

$g(p)=S_0+(S_1-S_0)*T(p)$
$f(s)=F_0+(F_1-F_0)*s$
$f(s_p)=F_0+(F_1-F_0)*s_p$

S is the determined area size of the feedback graph; $S_0$ is a preset minimum area of the feedback graph in a case of an area parameter $s_p$; $S_1$ is a preset maximum area of the feedback graph in a case of the area parameter $s_p$;

p is a normalized value of acquired touch pressure, and $$p = \frac{P_{in} - P_{min}}{P_{max} - P_{min}},$$

where $P_{in}$ is the acquired touch pressure, $P_{min}$ is preset minimum touch pressure, and $P_{max}$ is preset maximum touch pressure; T(p) is an interpolator function; $F_0$ is a preset minimum value of an area variation amplitude; $F_1$ is a preset maximum value of the area variation amplitude; f(s) is a function of the area variation amplitude; and s is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area.

According to a visual feedback method and apparatus for touch selection that are provided by embodiments of the present invention, touch information and a center point of touch are acquired, where the foregoing touch information is a touch area and/or touch pressure; an area size of a feedback graph is determined according to the foregoing touch information; and, by using the foregoing center point of touch as a center, the foregoing feedback graph is displayed according to the area size of the feedback graph, for a user to determine a touch position. Because the area size of the feedback graph is determined according to the touch information (a touch area and/or touch pressure), precision of visual feedback for touch selection can be improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In the present invention, a size of a feedback graph is determined with reference to a touch area and/or touch pressure, so as to improve precision of visual feedback for touch selection.

Figure 1:
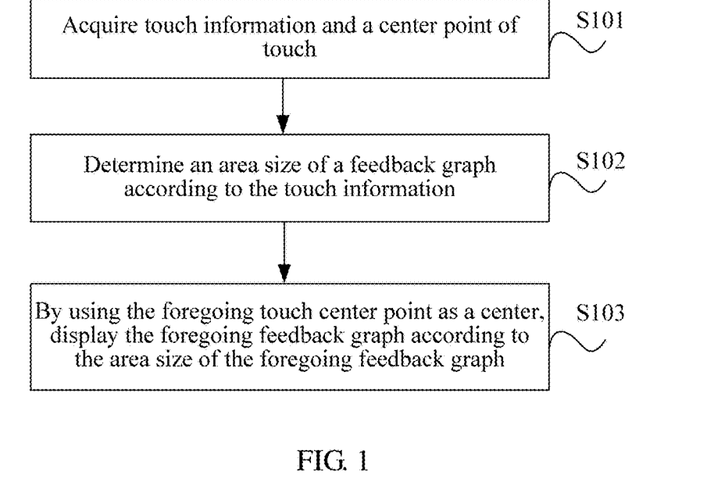
FIG. 1 is a schematic flowchart of Embodiment 1 of a visual feedback method for touch selection according to the present invention.

The following describes technical solutions of the present invention in detail with reference to specific embodiments:

FIG. 1 is a schematic flowchart of Embodiment 1 of a visual feedback method for touch selection according to the present invention. As shown in FIG. 1, the method in this embodiment includes the following steps:

S101. Acquire touch information and a center point of touch.

The touch information is a touch area and/or touch pressure. The center point of touch is a center of a touch surface.

S102. Determine an area size of a feedback graph according to the touch information.

Specifically, in a first implementation manner, when the touch information is a touch area, the area size of the feedback graph may be determined according to the following formula:

$S=S_0+(S_1-S_0) \times T(s)$

S is the determined area size of the feedback graph; $S_0$ is a preset minimum area of the feedback graph; $S_1$ is a preset maximum area of the feedback graph; and s is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area. T(s) is an interpolator function, and any one of the following (not limited to the following) interpolator functions may be used according to a specific situation:

A first type of interpolator function: T(s)s.

A second type of interpolator function: $T(s)=s^i$, where i is an integer greater than or equal to 2. Preferably, i is usually set to 2, 3, 4, or 5.

A third type of interpolator function: T(s) is determined by a cubic Bezier curve B(t), where the cubic Bezier curve is $B(t)=P_0(1-t)^3+3P_1(1-t)^2t+3P_2(1-t)t^2+P_3t^3$, and $P_0$, $P_1$, $P_2$, and $P_3$ are four preset control points. For example, the control points are $P_0(0,0)$, $P_1(0.5,-0.05)$, $P_2(0.6,1)$, and $P_3(1,1)$.

In a second implementation manner, when the touch information is touch pressure, the area size of the feedback graph may be determined according to the following formula:

$S=S_0+(S_1-S_0) \times T(p)$

S is the determined area size of the feedback graph; $S_0$ is a preset minimum area of the feedback graph; $S_1$ is a preset maximum area of the feedback graph; p is a normalized value of acquired touch pressure; and T(p) is an interpolator function, and the interpolator function T(p) is any one of the following functions:

$T(p)=p$, or $T(p)=p^i$, where $i$ is an integer greater than or equal to 2, or

T(p) is determined by a cubic Bezier curve B(t), where the cubic Bezier curve is $B(t)=P_0(1-t)^3+3P_1(1-t)^2t+3P_2(1-t)t^2+P_3t^3$ and $P_0$, $P_1$, $P_2$, and $P_3$ are four preset control points.

In a third implementation manner, when the touch information is a touch area and touch pressure, the area size of the feedback graph may be determined according to the following formula:

$S=f(s)*g(p)/g(p_s)$ where:

$f(s)=S_0+(S_1-S_0)*T(s)$
$g(p)=P_0+(P_1-P_0)*p$
$g(p_s)=P_0+(P_1-P_0)*p_s$

S is the determined area size of the feedback graph; $S_0$ is a preset minimum area of the feedback graph in a case of a pressure value $p_s$; $S_1$ is a preset maximum area of the feedback graph in a case of the pressure value $p_s$; f(s) is a determined area size of the feedback graph in a case of the pressure value $p_s$; s is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area; T(s) is an interpolator function; $P_0$ is a preset minimum value of a pressure variation amplitude; $P_1$ is a preset maximum value of the pressure variation amplitude; g(p) is a function of the pressure variation amplitude; and p is a normalized value of acquired touch pressure, and $$p = \frac{P_{in} - P_{min}}{P_{max} - P_{min}},$$

where $P_{in}$ is the acquired touch pressure, $P_{min}$ is preset minimum touch pressure, and $P_{max}$ is preset maximum touch pressure.

The interpolator function T(s) is any one of the following functions:

$T(s)=s$, or $T(s)=s^i$, where $i$ is an integer greater than or equal to 2, or

T(s) is determined by a cubic Bezier curve B(t), where the cubic Bezier curve is $B(t)=P_0(1-t)^3+3P_1(1-t)^2t+3P_2(1-t)t^2+P_3t^3$ and $P_0$, $P_1$, $P_2$, and $P_3$ are four preset control points.

In a fourth implementation manner, when the touch information is a touch area and touch pressure, the area size of the feedback graph may be determined according to the following formula:

$$S = g(p)*f(s)/g(s_p)$$

where:

$g(p) = S_0 + (S_1 - S_0)*T(p)$ $f(s) = F_0 + (F_1 - F_0)*s$ $f(s_p) = F_0 + (F_1 - F_0)*s_p.$

S is the determined area size of the feedback graph; $S_0$ is a preset minimum area of the feedback graph in a case of an area parameter $s_p$; $S_1$ is a preset maximum area of the feedback graph in a case of the area parameter $s_p$; p is a normalized value of acquired touch pressure, and $$p = \frac{P_{in} - P_{min}}{P_{max} - P_{min}},$$

where $P_{in}$ is the acquired touch pressure, $P_{min}$ is preset minimum touch pressure, and $P_{max}$ is preset maximum touch pressure; T(p) is an interpolator function; $F_0$ is a preset minimum value of an area variation amplitude; $F_1$ is a preset maximum value of the area variation amplitude; f(s) is a function of the area variation amplitude; and s is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area.

The interpolator function T(p) is any one of the following functions:

$T(p)=p$, or $T(p)=p^i$, where $i$ is an integer greater than or equal to 2, or

T(p) is determined by a cubic Bezier curve B(t), where the cubic Bezier curve is $B(t)=P_0(1-t)^3+3P_1(1-t)^2t+3P_2(1-t)t^2+P_3t^3$, and $P_0$, $P_1$, $P_2$, and $P_3$ are four preset control points.

Certainly, the foregoing several implementation manners are only examples for determining the area size of the feedback graph according to the touch information, and another implementation manner may also be used to determine the area size of the feedback graph according to the touch information, which is not limited by the present invention. Any implementation manner of determining an area size of a feedback graph with reference to a touch area and/or touch pressure to improve precision of visual feedback shall fall within the protection scope of the present invention.

S103. By using the foregoing center point of touch as a center, display the foregoing feedback graph according to the area size of the foregoing feedback graph.

Positions of a center point of the feedback graph and the center point of touch are the same. In the present invention, a size of the feedback graph is determined according to the touch information, and a form of the feedback graph is not presented in the present invention, for example, the feedback graph may be highlighted, or the feedback graph is displayed in another color, or the feedback graph has a hatch pattern, which is not limited by the present invention.

In this embodiment, touch information and a center point of touch are acquired, where the foregoing touch information is a touch area and/or touch pressure; an area size of a feedback graph is determined according to the foregoing touch information; and, by using the foregoing center point of touch as a center, the foregoing feedback graph is displayed according to the area size of the feedback graph, for a user to determine a touch position. Because the size of a feedback graph is determined according to the touch information (a touch area and/or touch pressure), precision of visual feedback for touch selection can be improved, which better satisfies a user's requirement and improves user experience.

Figure 2:
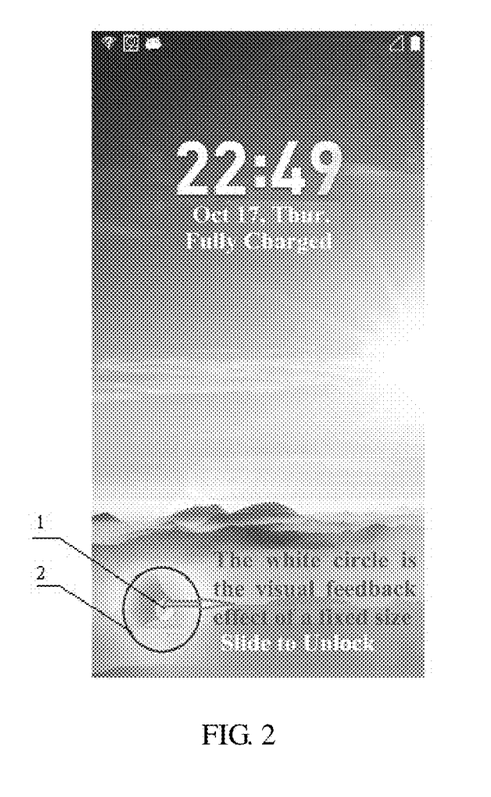
FIG. 2 is a display effect diagram of a feedback graph in a case of first touch pressure.
Figure 3:
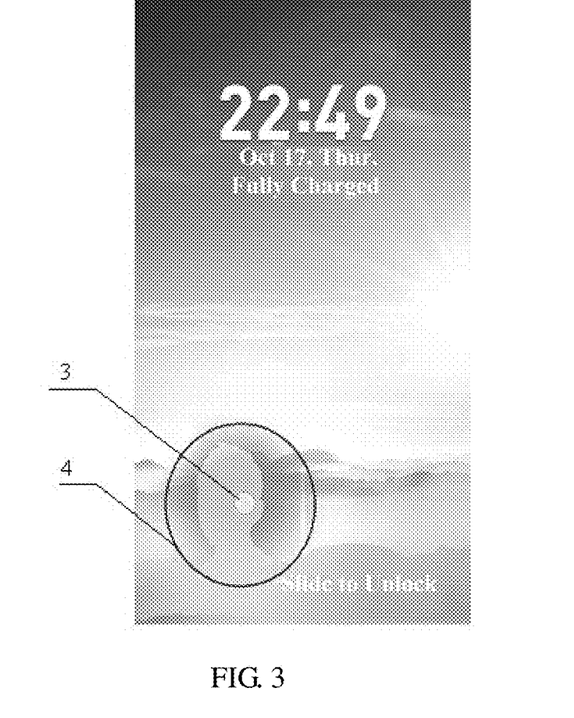
FIG. 3 is a display effect diagram of a feedback graph in a case of second touch pressure.

The present invention further provides two accompanying drawings for comparison, so as to facilitate understanding of technical solutions of the present invention. FIG. 2 is a display effect diagram of a feedback graph in a case of first touch pressure, and FIG. 3 is a display effect diagram of a feedback graph in a case of second touch pressure, where the first touch pressure is less than the second touch pressure. In FIG. 2, region 1 is a feedback graph in a case of the first touch pressure in the prior art, and region 2 is a feedback graph in a case of the first touch pressure in the present invention. In FIG. 3, region 3 is a feedback graph in a case of the second touch pressure in the prior art, and region 4 is a feedback graph in a case of the second touch pressure in the present invention. It can be seen by comparing FIG. 2 with FIG. 3 that, in the prior art, a change of touch pressure does not affect a size of a feedback graph, that is, region 1 and region 3 are of a same size. In the technical solutions of the present invention, the feedback graph in a case of the first touch pressure is smaller than the feedback graph in a case of the second touch pressure, that is, region 2 is smaller than region 4 in size. That is, an area size of a feedback graph in the present invention is determined according to the touch pressure. FIG. 2 and FIG. 3 are only examples of determining the area size of the feedback graph according to pressure. As can be seen from FIG. 2 and FIG. 3, visual feedback for touch selection can be improved by using the technical solutions of the present invention.

Figure 4:
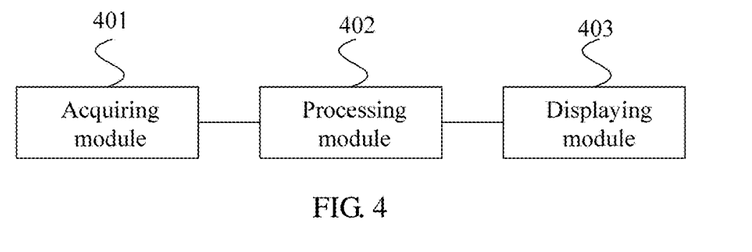
FIG. 4 is a schematic structural diagram of Embodiment 1 of a visual feedback apparatus for touch selection according to the present invention.

FIG. 4 is a schematic structural diagram of Embodiment 1 of a visual feedback apparatus for touch selection according to the present invention. As shown in FIG. 4, the apparatus in this embodiment includes an acquiring module 401, a processing module 402, and a displaying module 403. The acquiring module 401 is configured to acquire touch information and a center point of touch, where the touch information is a touch area and/or touch pressure; the processing module 402 is configured to determine an area size of a feedback graph according to the touch information; and the displaying module 403 is configured to display, by using the center point of touch as a center, the feedback graph according to the area size of the feedback graph, for a user to determine a touch point.

The apparatus in this embodiment may be accordingly used to implement the technical solution in the method embodiment shown in FIG. 1. Implementation principles and technical effects of the apparatus are similar to those of the method embodiment, and details are not described herein again.

In the foregoing embodiment, when the touch information is a touch area, the processing module 402 is specifically configured to determine the area size of the feedback graph according to $S=S_0+(S_1-S_0)\times T(s)$, where:

S is the determined area size of the feedback graph; $S_0$ is a preset minimum area of the feedback graph; $S_1$ is a preset maximum area of the feedback graph; T(s) is an interpolator function; and s is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area.

In the foregoing embodiment, the interpolator function T(s) is any one of the following functions:

$T(s)=s$, or $T(s)=s^i$, where $i$ is an integer greater than or equal to 2, or

T(s) is determined by a cubic Bezier curve B(t), where the cubic Bezier curve is $B(t)=P_0(1-t)^3+3P_1(1-t)^2t+3P_2(1-t)t^2+P_3t^3$, and $P_0$, $P_1$, $P_2$, and $P_3$ are four preset control points.

In the foregoing embodiment, when the touch information is touch pressure, the processing module 402 is specifically configured to determine the area size of the feedback graph according to $S=S_0+(S_1-S_0)\times T(p)$, where:

S is the determined area size of the feedback graph; $S_0$ is a preset minimum area of the feedback graph; $S_1$ is a preset maximum area of the feedback graph; T(p) is an interpolator function; and p is a normalized value of acquired touch pressure, and $$p = \frac{P_{in} - P_{min}}{P_{max} - P_{min}},$$

where $P_{in}$ is the acquired touch pressure, $P_{min}$ is preset minimum touch pressure, and $P_{max}$ is preset maximum touch pressure.

In the foregoing embodiment, the interpolator function T(p) is any one of the following functions:

$T(p)=p$, or $T(p)=p^i$, where $i$ is an integer greater than or equal to 2, or

T(p) is determined by a cubic Bezier curve B(t), where the cubic Bezier curve is $B(t)=P_0(1-t)^3+3P_1(1-t)^2t+3P_2(1-t)t^2+P_3t^3$, and $P_0$, $P_1$, $P_2$, and $P_3$ are four preset control points.

In the foregoing embodiment, when the touch information is a touch area and touch pressure, the processing module 402 is specifically configured to determine the area size of the feedback graph according to $S=f(s)*g(p)/g(p_s)$, where:

$f(s)=S_0+(S_1-S_0)*T(s)$ $g(p)=P_0+(P_1-P_0)*p$ $g(p_s)=P_0+(P_1-P_0)*p_s$

S is the determined area size of the feedback graph; $S_0$ is a preset minimum area of the feedback graph in a case of a pressure value $p_s$; $S_1$ is a preset maximum area of the feedback graph in a case of the pressure value $p_s$; f(s) is a determined area size of the feedback graph in a case of the pressure value $p_s$; s is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area; T(s) is an interpolator function; $P_0$ is a preset minimum value of a pressure variation amplitude; $P_1$ is a preset maximum value of the pressure variation amplitude; g(p) is a function of the pressure variation amplitude; and p is a normalized value of acquired touch pressure, and $$p = \frac{P_{in} - P_{min}}{P_{max} - P_{min}},$$

where $P_{in}$ is the acquired touch pressure, $P_{min}$ is preset minimum touch pressure, and $P_{max}$ is preset maximum touch pressure.

In the foregoing embodiment, the interpolator function T(s) is any one of the following functions:

T(s)=s, or

T(s)=$s^i$, where $i$ is an integer greater than or equal to 2, or

T(s) is determined by a cubic Bezier curve B(t), where the cubic Bezier curve is B(t)=$P_0(1-t)^3+3P_1(1-t)^2t+3P_2(1-t)t^2+P_3t^3$, and $P_0$, $P_1$, $P_2$, and $P_3$ are four preset control points.

In the foregoing embodiment, when the touch information is a touch area and touch pressure, the processing module 402 is specifically configured to determine the area size of the feedback graph according to S=g(p)*f(s)/g($s_p$), where:

$$g(p) = S_0 + (S_1 - S_0) * T(p)$$
$$f(s) = F_0 + (F_1 - F_0) * s$$
$$f(s_p) = F_0 + (F_1 - F_0) * s_p.$$

S is the determined area size of the feedback graph; $S_0$ is a preset minimum area of the feedback graph in a case of an area parameter $s_p$; $S_1$ is a preset maximum area of the feedback graph in a case of the area parameter $s_p$; p is a normalized value of acquired touch pressure, and $$p = \frac{P_{in} - P_{min}}{P_{max} - P_{min}},$$

where $P_{in}$ is the acquired touch pressure, $P_{min}$ is preset minimum touch pressure, and $P_{max}$ is preset maximum touch pressure; T(p) is an interpolator function; $F_0$ is a preset minimum value of an area variation amplitude; $F_1$ is a preset maximum value of the area variation amplitude; f(s) is a function of the area variation amplitude; and s is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area.

In the foregoing embodiment, the interpolator function T(p) is any one of the following functions:

T(p)=p, or

T(p)=$p^i$, where $i$ is an integer greater than or equal to 2, or

T(p) is determined by a cubic Bezier curve B(t), where the cubic Bezier curve is B(t)=$P_0(1-t)^3+3P_1(1-t)^2t+3P_2(1-t)t^2+P_3t^3$, and $P_0$, $P_1$, $P_2$, and $P_3$ are four preset control points.

Figure 5:
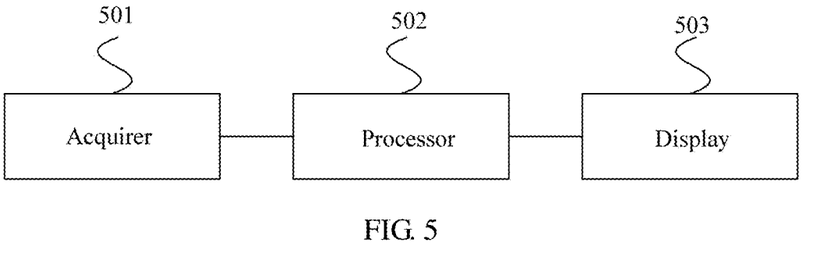
FIG. 5 is a schematic structural diagram of Embodiment 2 of a visual feedback apparatus for touch selection according to the present invention.

FIG. 5 is a schematic structural diagram of Embodiment 2 of a visual feedback apparatus for touch selection according to the present invention. As shown in FIG. 5, the apparatus in this embodiment includes an acquirer 501, a processor 502, and a display 503. The acquirer 501 is configured to acquire touch information and a center point of touch, where the touch information is a touch area and/or touch pressure; the processor 502 is configured to determine an area size of a feedback graph according to the touch information; and the display 503 is configured to display, by using the center point of touch as a center, the feedback graph according to the area size of the feedback graph, for a user to determine a touch point.

The apparatus in this embodiment may be accordingly used to implement the technical solution in the method embodiment shown in FIG. 1. Implementation principles and technical effects of the apparatus are similar to those of the method embodiment, and details are not described herein again.

In the foregoing embodiment, when the touch information is a touch area, the processor 502 is specifically configured to determine the area size of the feedback graph according to S=$S_0+(S_1-S_0)\times T(s)$, where:

S is the determined area size of the feedback graph; $S_0$ is a preset minimum area of the feedback graph; $S_1$ is a preset maximum area of the feedback graph; T(s) is an interpolator function; and s is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area.

In the foregoing embodiment, the interpolator function T(s) is any one of the following functions:

T(s)=s, or

T(s)=$s^i$, where $i$ is an integer greater than or equal to 2, or

T(s) is determined by a cubic Bezier curve B(t)$_5$ where the cubic Bezier curve is B(t)=$P_0(1-t)^3+3P_1(1-t)^2t+3P_2(1-t)t^2+P_3t^3$, and $P_0$, $P_1$, $P_2$, and $P_3$ are four preset control points.

In the foregoing embodiment, when the touch information is touch pressure, the processor 502 is specifically configured to determine the area size of the feedback graph according to S=$S_0+(S_1-S_0)\times T(p)$, where:

S is the determined area size of the feedback graph; $S_0$ is a preset minimum area of the feedback graph; $S_1$ is a preset maximum area of the feedback graph; T(p) is an interpolator function; and p is a normalized value of acquired touch pressure, and $$p = \frac{P_{in} - P_{min}}{P_{max} - P_{min}},$$

where $P_{in}$ is the acquired touch pressure, $P_{min}$ is preset minimum touch pressure, and $P_{max}$ is preset maximum touch pressure.

In the foregoing embodiment, the interpolator function $T(p)$ is any one of the following functions:

$T(p)=p$, or $T(p)=p^i$, where $i$ is an integer greater than or equal to 2, or $T(p)$ is determined by a cubic Bezier curve $B(t)$, where the cubic Bezier curve is $B(t)=P_0(1-t)^3+3P_1(1-t)^2t+3P_2(1-t)t^2+P_3t^3$, and $P_0$, $P_1$, $P_2$, and $P_3$ are four preset control points.

In the foregoing embodiment, when the touch information is a touch area and touch pressure, the processor 502 is specifically configured to determine the area size of the feedback graph according to $S=f(s)*g(p)/g(p_s)$, where:

$f(s)=S_0+(S_1-S_0)*T(s)$
$g(p)=P_0+(P_1-P_0)*p$
$g(P_s)=P_0+(P_1-P_0)*p_s$ $S$ is the determined area size of the feedback graph; $S_0$ is a preset minimum area of the feedback graph in a case of a pressure value $p_s$; $S_1$ is a preset maximum area of the feedback graph in a case of the pressure value $p_s$; $f(s)$ is a determined area size of the feedback graph in a case of the pressure value $p_s$; $s$ is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area; $T(s)$ is an interpolator function; $P_0$ is a preset minimum value of a pressure variation amplitude; $P_1$ is a preset maximum value of the pressure variation amplitude; $g(p)$ is a function of the pressure variation amplitude; and $p$ is a normalized value of acquired touch pressure, and $$p = \frac{P_{in} - P_{min}}{P_{max} - P_{min}},$$

where $P_{in}$ is the acquired touch pressure, $P_{min}$ is preset minimum touch pressure, and $P_{max}$ is preset maximum touch pressure.

In the foregoing embodiment, the interpolator function $T(s)$ is any one of the following functions:

$T(s)=s$, or $T(s)=s^i$, where $i$ is an integer greater than or equal to 2, or $T(s)$ is determined by a cubic Bezier curve $B(t)$, where the cubic Bezier curve is $B(t)=P_0(1-t)^3+3P_1(1-t)^2t+3P_2(1-t)t^2+P_3t^3$, and $P_0$, $P_1$, $P_2$, and $P_3$ are four preset control points.

In the foregoing embodiment, when the touch information is a touch area and touch pressure, the processor 502 is specifically configured to determine the area size of the feedback graph according to $S=g(p)*f(s)/g(s_p)$, where:

$g(p) = S_0 + (S_1 - S_0) * T(p)$
$f(s) = F_0 + (F_1 - F_0) * s$
$f(s_p) = F_0 + (F_1 - F_0) * s_p.$ $S$ is the determined area size of the feedback graph; $S_0$ is a preset minimum area of the feedback graph in a case of an area parameter $s_p$; $S_1$ is a preset maximum area of the feedback graph in a case of the area parameter $s_p$; $p$ is a normalized value of acquired touch pressure, and $$p = \frac{P_{in} - P_{min}}{P_{max} - P_{min}},$$

where $P_{in}$ is the acquired touch pressure, $P_{min}$ is preset minimum touch pressure, and $P_{max}$ is preset maximum touch pressure; $T(p)$ is an interpolator function; $F_0$ is a preset minimum value of an area variation amplitude; $F_1$ is a preset maximum value of the area variation amplitude; $f(s)$ is a function of the area variation amplitude; and $s$ is a normalized value of an acquired touch area, and $$s = \frac{S_{in} - S_{min}}{S_{max} - S_{min}},$$

where $S_{in}$ is the acquired touch area, $S_{min}$ is a preset minimum touch area, and $S_{max}$ is a preset maximum touch area.

In the foregoing embodiment, the interpolator function $T(p)$ is any one of the following functions:

$T(p)=p$, or $T(p)=p^i$, where $i$ is an integer greater than or equal to 2, or $T(p)$ is determined by a cubic Bezier curve $B(t)$, where the cubic Bezier curve is $B(t)=P_0(1-t)^3+P_1(1-t)^2t+3P_2(1-t)t^2+P_3t^3$, and $P_0$, $P_1$, $P_2$, and $P_3$ are four preset control points.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A visual feedback method for touch selection, comprising:
   acquiring touch information and a center point of touch, wherein the touch information is a touch area;
   determining an area size of a feedback graph according to a normalized value of the touch information; and displaying the feedback graph according to the area size of the feedback graph and such that a user can determine a touch position from the feedback graph, wherein the displaying comprises using the center point of touch as a center;

wherein the determining the area size of the feedback graph comprises determining the area size of the feedback graph according to $S=S_0+(S_1-S_0)\times T(s)$;

wherein S is the determined area size of the feedback graph; $S_0$ is a preset minimum area of the feedback graph, $S_1$ is a preset maximum area of the feedback graph, T(s) is an interpolator function, s is a normalized value of an acquired touch area; and wherein $$s = \frac{S_{in} - S_{min}}{S_{max} - S_{min}},$$

wherein $S_{in}$ is the acquired touch area, $S_{min}$ is a preset minimum touch area, and $S_{max}$ is a preset maximum touch area.

2. A visual feedback apparatus for touch selection, comprising:
a processor;
a non-transitory computer readable medium connected to the processor and having stored thereon instructions for causing the processor to:
acquire touch information and a center point of touch, wherein the touch information is a touch area;
determine an area size of a feedback graph according to a normalized value of the touch information; and
display the feedback graph according to the area size of the feedback graph and such that user can determine a touch position, wherein the feedback graph is displayed using the center point of touch as a center;

wherein the instructions for causing the processor to determine the area size of a feedback graph comprise instructions for causing the processor to determine the area size of the feedback graph according to $S=S_0+(S_1-S_0)\times T(s)$;

wherein S is the determined area size of the feedback graph; $S_0$ is a preset minimum area of the feedback graph, $S_1$ is a preset maximum area of the feedback graph, T(s) is an interpolator function, s is a normalized value of an acquired touch area; and wherein $$s = \frac{S_{in} - S_{min}}{S_{max} - S_{min}},$$

wherein $S_{in}$ is the acquired touch area, $S_{min}$ is a preset minimum touch area, and $S_{max}$ is a preset maximum touch area.

* * * * *